May 17, 1949.  J. GALL  2,470,484

OIL STICK WIPER

Filed June 19, 1947

INVENTOR.

James Gall

BY *Victor J. Evans & Co.*

ATTORNEYS

Patented May 17, 1949

2,470,484

UNITED STATES PATENT OFFICE 2,470,484

OIL STICK WIPER

James Gall, Jeannette, Pa.

Application June 19, 1947, Serial No. 755,625

2 Claims. (Cl. 15—210)

1

This invention relates to an oil stick wiper, and has for its primary object the provision of a simple and economically constructed device for effectively wiping the oil sticks used in gauging the oil content of the crank cases of motor vehicle engines.

An object of the invention is to provide a wiper incorporating means therein to mount the wiper on an oil stick to facilitate the wiping of the oil from the stick as desired.

Another object of the invention is to provide an absorbent wiper which will absorb all the residue oil remaining on the oil stick when wiped thereover.

Figure 1:
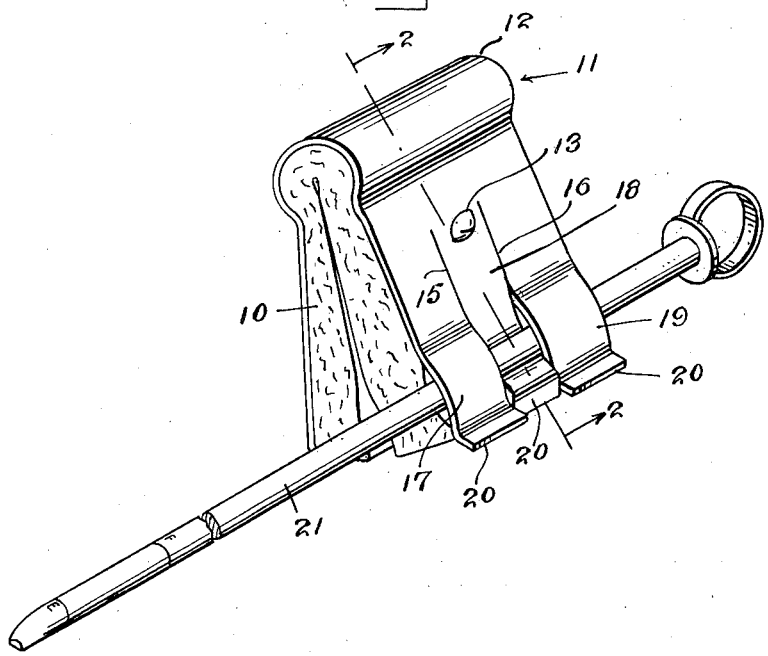
Figure 2:
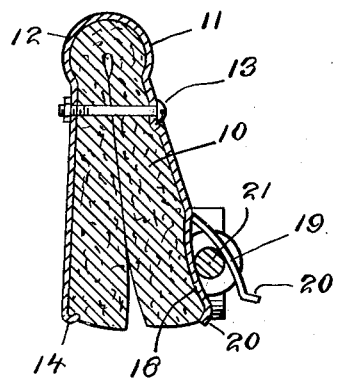

With the above and other objects and advantages in view, the invention consists of the novel details of construction, arrangement and combination of parts more fully hereinafter described, claimed and illustrated in the accompanying drawing in which:

Figure 1 is a perspective view of an embodiment of the invention as mounted on the oil stick of a motor vehicle and Figure 2 is a sectional view on the line 2—2 of Figure 1.

Referring more in detail to the drawing, the wiper embodying the invention comprises the absorbent wiping element 10 and the holder 11 therefor. The wiping element 10 comprises a rectangular shaped sheet of absorbent material which is bent upon itself to assume a V-form in cross-section.

The holder 11 comprises a sheet of metal which is bent in a V-form in cross-section to conform to the outer contours of the element 10.

The holder, at its apex 12, is curved in cross-section to form a clamping means for retaining the wiping element in the holder, and a fastener 13 passing through the holder and element, more firmly retains the element and holder as a unitary structure.

One side of the holder 11 is inturned at 14 to engage the lower end of the element 10 adjacent this side, and retain this end and side of the wiping element in close contact with the side of the holder 11.

The opposite side of the holder 11 is split at 15 and 16 respectively to form the gripping elements 17, 18 and 19 respectively, each of which is provided with out-turned ends 20.

The end of the inturned element 18 underlies the side of the wiping element 10, as does the inturned end 14 of the holder 11 on the side opposite thereto.

In use, the oil stick 21 is easily positioned in

2 the gripping elements, as shown in Figure 1, due to the formation of the ends 20, and once so positioned, the holder is firmly retained on the stick.

When it is desired to clean the stick, the holder is removed therefrom, and the stick is drawn through intermediate of the sides of the wiper for the cleaning thereof. After use, the holder is again applied to the stick, and as the stick is again inserted into position in the crank case of the motor, it will easily slide upwardly on the stick to permit the stick to be properly seated in its normal position in the crank case.

There has thus been provided, an oil stick wiper which will effectively clean the oil stick of a motor vehicle, and it is believed that the structure and use of the wiper will be apparent to those skilled in the art. It is also to be understood that changes in the arrangement and combination of the various parts utilized to form the invention may be resorted to, providing such changes fall with within the spirit of the invention and the scope of the appended claims.

Having thus described the invention, what is claimed as new and desired to be secured by Letters Patent is:

1. An oil stick wiper of the type described, comprising a sheet of absorbent material which is of V-form in cross-section, a holder mounted on the outer surface of said material, means for clamping said holder on said material, and clamping elements on said holder for retaining said holder on an oil stick for a motor vehicle engine.

2. An oil stick wiper comprising a sheet of absorbent material which is bent upon itself to form a V, a holder on said sheet conforming to the outer contour thereof, a clamping portion for said sheet formed in said holder, means for retaining said sheet in said holder, an inturned edge on one side of said holder engaging the lower end of one side of said sheet, and clamping elements formed on the opposite side of said holder for retaining said holder on the oil stick of a motor vehicle engine.

JAMES GALL.

REFERENCES CITED

The following references are of record in the file of this patent:

UNITED STATES PATENTS

| Number | Name | Date |
|---|---|---|
| 1,770,300 | Davis | July 8, 1930 |
| 1,947,833 | Dolbier | Feb. 20, 1934 |
| 1,992,423 | Hale | Feb. 26, 1935 |